Figure 1:
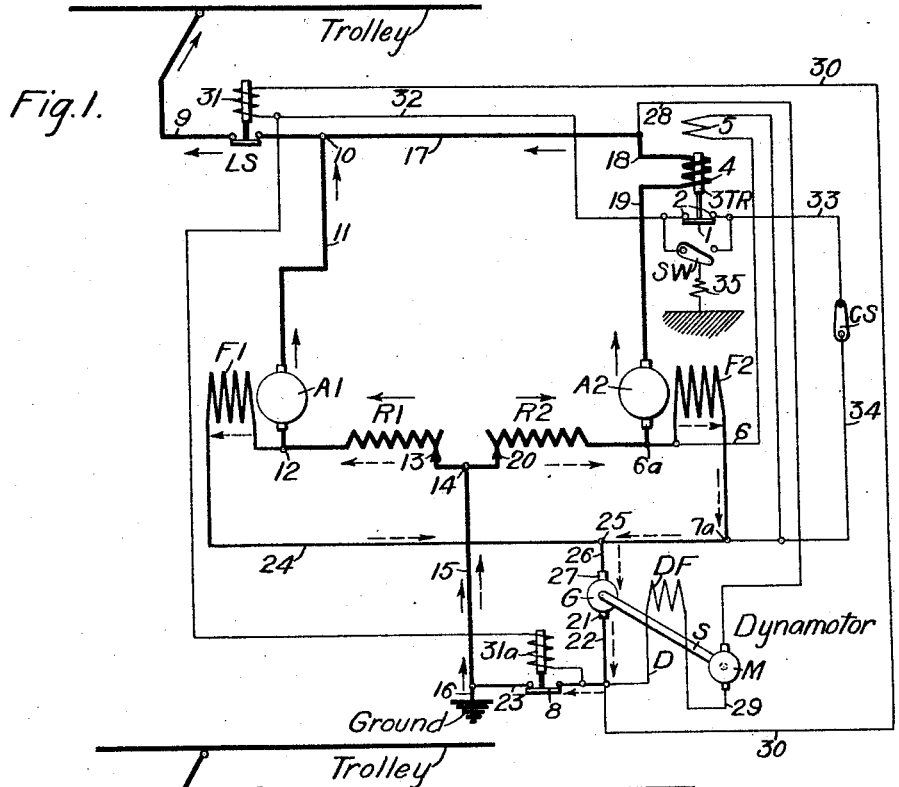

R. E. HELLMUND.
SYSTEM OF CONTROL.
APPLICATION FILED JULY 5, 1919.

1,417,734.

Patented May 30, 1922.

WITNESSES:
J. A. Helsel
W. R. Coley

INVENTOR
Rudolf E. Hellmund.
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,417,734.  Specification of Letters Patent.  Patented May 30, 1922.

Application filed July 5, 1919. Serial No. 308,771.

*To all whom it may concern:*

Be it known that I, RUDOLF E. HELLMUND, a citizen of the German Empire, and a resident of Pittsburgh, in the county of Allegheny and State of Pennsylvania, have invented a new and useful Improvement in Systems of Control, of which the following is a specification, this application being a continuation in part of my copending application Serial No. 102,500, filed June 8, 1916.

My invention relates to systems of control for dynamo-electric machines and especially to the regenerative control of electric railway vehicle motors and the like.

In connection with direct-current regenerative control, it is usually desirable to employ separate excitation for the field windings of the momentum-driven machines, and means whereby preferably a negative compound characteristic is imparted to the regenerating machines; and thus an inherently stable system is provided, as fully set forth and claimed in my co-pending application, Serial No. 44,443, filed Aug. 9, 1915, patented Apr. 1, 1919, No. 1,298,706. By "negative compound characteristic" I mean the inherent tendency to decrease the field-winding excitation upon an incipient increase of armature current, and vice versa. In other words, the armature and field current vary oppositely or follow different characteristic curves with changing load conditions. However, under such circumstances, it is possible for the vehicle to drift along under relatively low-speed conditions, while the machines are not exerting either an accelerating or a braking torque; in other words, there is a certain inactive period between the end of regenerative operation and the beginning of accelerating operation, wherein the machines are connected to the supply circuit without doing any useful work. Such conditions are objectionable, especially since the main field windings are relatively strongly excited at that time and, consequently, the copper loss in the field windings and the core loss in the armature serve to unduly heat the machine without such heat being represented by any useful energy output. It will be appreciated that railway motors in particular are normally operated under relatively high temperature conditions and if the above-mentioned heat losses are added to those created by normal operation, the total may reach a dangerous or at least a very undesirable value.

The object of my present invention is to provide means in the form of a relay device that is actuated in accordance with the torque of the momentum-driven machines for the purpose of automatically opening the machine circuits, including disconnecting the machines from the supply circuit as soon as the regenerative operation is completed, whereby the previously mentioned undesirable heat losses are entirely avoided.

Viewed from another angle, it is an object of my invention to interrupt the regenerative operation under predetermined operating conditions wherein the ratio of electrical and magnetic losses to machine output, or the ratio of heating losses to torque, exceeds selected limits; that is, during the above-mentioned inactive period when no useful work is being performed, but heating losses in the machine coils and core occur, in the systems of the prior art.

Figure 2:
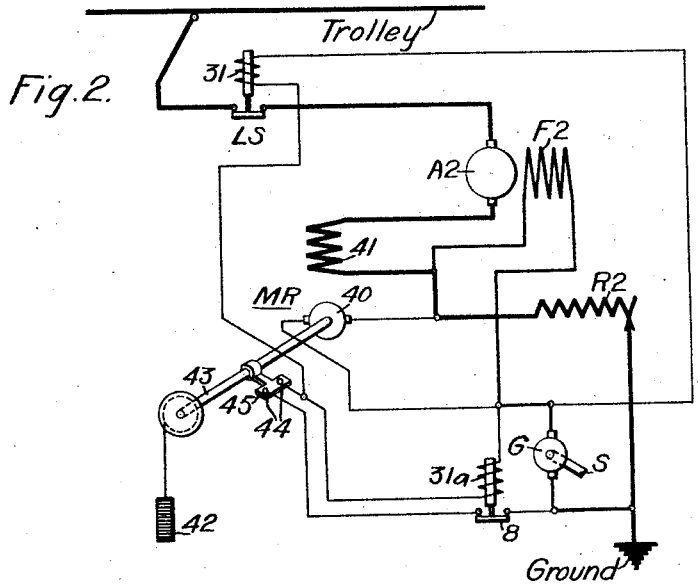

My invention may best be understood by reference to the accompanying drawing, wherein Fig. 1 is a diagrammatic view of a system of control embodying my invention; and Fig. 2 is a diagrammatic view of a modification of the invention.

Referring to the drawing, the system shown comprises a plurality of suitable supply-circuit conductors respectively marked "Trolley" and "Ground"; a plurality of main dynamo-electric machines respectively having armatures $A_1$ and $A_2$ and field windings $F_1$ and $F_2$ of the series type; a plurality of main-circuit variable resistors $R_1$ and $R_2$, which are associated with the respective main machines in a manner to be described; an auxiliary exciting source of energy such as a motor-generator set or dynamotor D which is adapted to be driven from the supply circuit and to excite the main field windings $F_1$ and $F_2$ under regenerative conditions; a switching device LS of a familiar electrically-controlled type for connecting the main circuits to, and disconnecting them from, the supply circuit; a second switching device 8 for closing and opening the exciting circuit; and my torque relay TR for automatically performing the previously recited function.

The motor-generator set or dynamotor D may comprise a driving or motor armature winding M, an exciting or generator armature winding G, the two armature windings being mechanically connected in any suitable manner, as by mounting upon a shaft s; and a common field-magnet winding DF for the two auxiliary armature windings, as is customary practice in dynamotor construction.

The torque relay TR comprises a movable switching member 1 which is adapted to bridge a pair of stationary contact members 2 under predetermined conditions. The movable member 1 is suitably secured to a magnetizable core member 3 that is associated with a plurality of actuating coils 4 and 5 which are respectively energized in accordance with the regenerated current traversing the main armature A2 and with the voltage of the main field winding F2, during the retardation period. The shunt actuating coil 5 has its terminals connected respectively to the terminals 6a and 7a of the field winding F2 through conductors 6 and 7.

The main-circuit connections about to be described form no part of my present invention, being employed for illustrative purposes only, and are fully set forth and claimed in my above-identified co-pending application. Moreover, since the particular type of regenerative control system that is employed is not pertinent to my invention, I have not deemed it necessary to show or describe means for initially effecting the various circuit connections that are illustrated or for inaugurating regenerative operation.

Assuming that regenerative operation has been started, the main-circuit connections may be traced as follows: one main circuit is established from the trolley through conductor 9, the line switch LS which is closed in a manner to be described, junction-point 10, where the circuit divides, one branch including conductor 11, main armature A1, junction-point 12, main-circuit resistor R1, a switching device 13, which is here conventionally shown as an arrow-head, junction-point 14 and conductors 15 and 16 to the negative conductor Ground, and the other branch including conductors 17 and 18, the series actuating coil 4 of the torque relay TR, conductor 19, main armature A2, junction-point 6a, main-circuit resistor R2, a switching device 20 which corresponds to the other switching device 13, and thence through junction-point 14 as just recited.

A main field-winding exciting circuit is established from one terminal of the generator armature winding G through conductor 22, switch 8 and conductor 23 to conductor 15 and junction-point 14, where the circuit divides, one branch including switching device 13, main-circuit resistor R1, junction-point 12, main field winding F1, conductor 24 and junction-point 25, and the other branch including switching device 20, main-circuit resistor R2, junction-point or field-winding terminal 6a, main field winding F2, terminal 7a and the junction-point 25, whence a common circuit is completed through conductor 26 to the other terminal 27 of the exciting armature winding G.

Another auxiliary circuit is completed from the conductor 17, through conductor 28, the driving armature winding M of the dynamotor D, conductor 29, the auxiliary field winding DF and thence through conductors 23 and 16 to the negative conductor Ground.

The respective main momentum-driven armatures are thus connected in series relation with the variable resistors R1 and R2 across the supply circuit, while the exciting armature winding G and the several main field windings F1 and F2 are connected in parallel relation to the main-circuit resistors R1 and R2 respectively.

The line switch LS and the exciting switch 8 are controlled by an auxiliary circuit that is established from one terminal 21 of the generating armature winding G through conductors 22 and 30, the parallel-related actuating coils 31 and 31a of the line switch LS and the exciting switch 8, respectively, conductor 32, the stationary movable contact members 2 and 1, respectively, of the torque relay TR in its energized or closed position, conductor 33, a control switch CS and conductors 34 and 26 to the other terminal 27 of the exciting armature winding G.

Since the torque relay TR has its series and shunt actuating coils 4 and 5, respectively energized in accordance with the current traversing the main armature A2 and with the voltage impressed upon the main field winding F2, it follows that the torque relay is controlled in accordance with the torque that is produced by one of the main momentum-driven machines, as will be understood from familiar electrical principles.

The regulation of the system to counteract the gradual decrease of vehicle speed during regenerative operation may be conveniently effected by gradually excluding the main-circuit resistors R1 and R2 from circuit, preferably in accordance with the regenerated current, as fully described in my above-identified co-pending application, and no further description of such regulation is believed to be necessary here.

When a relatively low speed has been reached, or, in other words, when the previously mentioned inactive period between generator and motor operation is about to begin, the torque of the momentum-driven machine having the armature A2 decreases to a relatively low value, whereupon the combined actions of the coils 4 and 5 of the torque relay TR are insufficient to maintain the relay in its closed position. Consequently, the torque relay automatically opens under the conditions in question to de-energize the actuating coil 31 of the line switch LS and the actuating coil 31a of the exciting switch 8 and thus disconnect the entire machine circuits from the supply circuit and also open the exciting circuit, whereby the undesirable heating effects hereinbefore mentioned are effectively prevented.

Since the normal or de-energized condition of the torque relay TR corresponds to the open position thereof, some auxiliary means for initially exciting the actuating coils 31 and 31a of the switches LS and 8 must be provided. One means for effecting the desired result comprises a suitable switching member SW which is adapted when closed to bridge the contact members of the torque relay TR and which is normally maintained in an open position by means of a biasing spring 35.

To initially energize the actuating coils 31 and 31a of the switches LS and 8 from the exciting armature winding G or any other suitable source, such as a storage battery, for instance, the auxiliary switch SW is temporarily held closed, whereupon a circuit is completed between the conductors 32 and 33 to initially close the line switch LS and the exciting switch 8. As soon as normal regenerative operation obtains, the torque relay TR is actuated to its upper or closed position and is maintained in such position until the previously mentioned inactive period is reached.

A modified form of torque relay device is shown in Fig. 2. The device comprises a motor-type relay MR having an armature 40 connected across the main field winding F2, and a field-magnet winding 41 of the series type, that is connected in series relation with the main armature A2. The armature 40 and the field winding 41 thus correspond to the shunt coil and the series coils 5 and 4, respectively, of the previously described torque relay TR.

A suitable biasing means, such as a weight 42, is adapted to act upon the shaft 43 of the torque relay armature 40, and the arrangement of parts is such that when accelerating current traverses the relay field winding 41, the relay torque acts in the same direction as the weight 42 to maintain a pair of stationary contact members or control fingers 44 disconnected from a segment or movable contact member 45; whereas when the regenerative or reversed current flows through the relay field winding 41, the relay torque opposes and overcomes the action of the weight 42 to maintain the contact members 44 and 45 connected, as illustrated, until the main machine torque decreases to a predetermined relatively low value, when the weight 42 overcomes the relay torque to disconnect the contact members 44 and 45 and thus effect the opening of the main-machine circuits, in the same manner as was described in connection with Fig. 1.

It will be understood that, for starting regenerative machine operations, some suitable device, such as the switch SW (Fig. 1) is employed in the system just described.

I do not wish to be restricted to the specific circuit connections or arrangement and location of parts herein set forth, as various modifications thereof may be effected without departing from the spirit and scope of my invention. I desire, therefore, that only such limitations shall be imposed as are indicated in the appended claims.

I claim as my invention:

1. In a system of regenerative control, the combination with a momentum-driven dynamo-electric machine having an armature and a field-magnet winding, of means for opening the regenerative circuit under predetermined operating conditions wherein the ratio of electrical and magnetic losses to machine output exceeds selected limits.

2. In a system of regenerative control, the combination with a momentum-driven dynamo-electric machine having an armature and a field-magnet winding, of means for interrupting the regenerative operation under predetermined operating conditions wherein the ratio of heating losses to torque exceeds selected limits.

3. In a system of regenerative control, the combination with a momentum-driven dynamo-electric machine having an armature and a field-magnet winding, of means directly and conjointly influenced by certain armature and field-winding conditions for opening the regenerative circuit of said machine whenever the ratio of electrical and magnetic losses to machine output exceeds selected limits.

4. In a system of regenerative control, the combination with a momentum-driven dynamo-electric machine having an armature and a field-magnet winding, of means conjointly influenced by certain armature and field-winding electrical conditions for interrupting the regenerative operation under machine conditions wherein the ratio of heating losses to torque exceeds selected limits.

5. In a system of regenerative control, the combination with a momentum-driven dynamo-electric machine having an armature and a field-magnet winding, of means conjointly influenced by the armature current and the field-winding voltage for opening the regenerative circuit under relatively low-torque machine conditions.

6. In a system of regenerative control, the combination with a separately excited momentum-driven dynamo-electric machine having an armature and a field-magnet winding, of means for opening the regenerative and the exciting circuits of said machine upon reaching the inactive period between generator and motor operation thereof, whereby undue machine heating is avoided.

7. In a system of regenerative control, the combination with a separately excited momentum-driven dynamo-electric machine having an armature and a field-magnet winding, of means conjointly influenced by certain armature and field-winding conditions for opening the regenerative and the exciting circuits of said machine upon reaching the inactive period between generator and motor operation thereof, whereby undue machine heating is avoided.

8. In a system of regenerative control, the combination with a separately excited momentum-driven dynamo-electric machine having an armature and a field-magnet winding, of means conjointly influenced by the armature current and the field-winding voltage for opening the regenerative and the exciting circuit upon reaching the inactive period between generator and motor operation, whereby undue machine heating is avoided.

9. In a system of regenerative control, the combination with a momentum-driven dynamo-electric machine having an armature and a field-magnet winding, of a relay device energized in accordance with the armature current and the field-winding voltage and normally biased to the open position to cause an opening of the machine circuit, the relay device being held closed to maintain the regenerative circuit until predetermined relatively low-torque machine conditions are reached.

10. In a system of regenerative control, the combination with a momentum-driven dynamo-electric machine having an armature and a field-magnet winding, of a switch for opening and closing the regenerative circuit and having an actuating coil, a relay device for governing the circuit of said actuating coil and having two controlling coils respectively energized in accordance with the armature current and the field-winding voltage, said device being normally biased to the open position and being held closed to maintain the closure of said switch only when the machine torque conditions exceed a predetermined value.

11. In a system of regenerative control, the combination with a momentum-driven dynamo-electric machine having an armature and a field-magnet winding, of an auxiliary source of energy for exciting the field winding, and means conjointly influenced by certain armature and field-winding conditions for opening the regenerative circuit under relatively low-torque machine conditions.

12. In a system of regenerative control, the combination with a momentum-driven dynamo-electric machine having an armature and a field-magnet winding, of an auxiliary source of energy for exciting the field winding, and a relay device having actuating coils respectively energized in accordance with the armature current and the field-winding voltage for opening the regenerative circuit under relatively low-torque machine conditions.

13. In a system of regenerative control, the combination with a momentum-driven dynamo-electric machine having an armature and a field-magnet winding, of a relay device having actuating coils respectively energized in accordance with certain armature and field-winding conditions and normally biased to the open position to cause an opening of the machine circuit, and means for bridging said relay device.

14. In a system of regenerative control, the combination with a momentum-driven dynamo-electric machine having an armature and a field-magnet winding, of an auxiliary source of energy for exciting the field winding, a relay device having actuating coils respectively energized in accordance with the armature current and the field-winding voltage, said device being normally biased to the open position to cause an opening of the machine circuit and being held closed during machine operation only when the machine torque conditions exceed a predetermined value, and switching means for temporarily bridging said relay device under starting conditions.

15. In a system of control, the combination with a dynamo-electric machine having an armature and a field-magnet winding, of connections whereby the armature and field currents follow different characteristic curves with changing load, and electrically operated relay means dependent upon a predetermined conjoint effect of armature current and the total field excitation for governing certain circuit connections of said machine.

16. In a system of control, the combination with a dynamo-electric machine having an armature and a field-magnet winding, of connections whereby the armature and field currents follow different characteristic curves with changing load, and means conjointly influenced by the armature current and substantially the total field excitation for materially modifying certain circuit connections under relatively low-torque conditions of the main machine.

17. In a system of control, the combination with a dynamo-electric machine having an armature and a field-magnet winding, of connections whereby the armature and field currents follow different characteristic curves with changing load, and means conjointly influenced by the armature current and the field-winding voltage for governing certain circuit connections under predetermined torque conditions of the main machine.

In testimony whereof, I have hereunto subscribed my name this 24th day of June, 1919.

RUDOLF E. HELLMUND.